United States Patent [19]

Kirman et al.

[11] Patent Number: 4,947,694
[45] Date of Patent: Aug. 14, 1990

[54] VIBRATING FORCE SENSOR

[75] Inventors: Richard G. Kirman, Walsall; Sally A. Spencer, Halesowen, both of United Kingdom

[73] Assignee: W & T Avery Limited, England

[21] Appl. No.: 321,190

[22] Filed: Mar. 9, 1989

[30] Foreign Application Priority Data

Mar. 16, 1988 [GB] United Kingdom ............... 8806214

[51] Int. Cl.⁵ .............................................. G01L 1/10
[52] U.S. Cl. ........................... 73/862.59; 177/210 FP
[58] Field of Search ............ 73/862.59, 517 AV, 778, 73/704, DIG. 1; 177/210 FP; 310/338; 331/156

[56] References Cited

U.S. PATENT DOCUMENTS

| | | | |
|---|---|---|---|
| 3,505,866 | 4/1970 | Weisbord et al. | 73/517 AV X |
| 3,657,667 | 4/1972 | Nishikubo et al. | 331/156 X |
| 4,299,122 | 11/1981 | Ueda et al. | 73/862.59 |
| 4,594,898 | 6/1986 | Kirman et al. | 73/862.59 X |
| 4,764,244 | 8/1988 | Chitty et al. | 73/704 X |

FOREIGN PATENT DOCUMENTS 0044321 3/1983 Japan ................... 73/862.59
576518 10/1977 U.S.S.R. .

OTHER PUBLICATIONS

"Force transducer using a double-ended tuning fork mechanical resonator with optical fibre links", M. J. Halliwell & B. E. Jones, Sep. 1987.

*Primary Examiner*—Charles A. Ruehl
*Attorney, Agent, or Firm*—Kirschstein, Ottinger, Israel & Schiffmiller

[57] ABSTRACT

A vibrating force sensor comprising a metallic strip having three metallic coplanar beams (20, 21, 22). The sensor also includes capacitive transducers (30, 31) for driving the beam or beams into flexural vibration in a plane normal to their common plane and for detecting changes in the frequency of vibrations in response to changes in tension applied to the sensor. Drive and detect electrodes (50, 51) are formed on the surface of an intermediate insulating layer (70) in turn located on the surface of a shielding layer (71) of conductive material.

9 Claims, 3 Drawing Sheets

PICKUP PATH

VIBRATING FORCE SENSOR

BACKGROUND OF THE INVENTION

1. Field of the Invention

The present invention concerns force sensors and in particular sensors in which variations in a beam's natural resonant frequency caused by tension applied to the beam are used to measure the tension.

2. Description of Related Art

Vibrating beam force sensors are known and essentially comprise a beam driven into flexural vibration by piezoelectric transducers mounted at its ends. The vibrational frequency changes in response to changes in the tension of the beam and these changes are measured to provide a measurement of the applied tension.

One type of vibrating beam force sensor is described in British Pat. Specification No.2141231B and comprises a sensor unit having in effect three parallel beams of piezoelectric material and of different widths the outer pair of which flex in antiphase to the inner beam. Such an arrangement has an improved Q factor when compared to a sensor employing a single beam. The Q factor indicates the amount of energy locked into the vibrating structure relative to the amount of energy required to maintain the vibrations. Another advantage of three-beam arrangements is a greater degree of isolation from the effects of small changes in the mounting conditions. However piezoelectric materials are expensive and difficult to machine.

SUMMARY OF THE INVENTION

The present invention has for an object to provide an improved form of three beam vibrational force sensor.

Accordingly the present invention consists in a vibrating force sensor comprising a metallic strip having three metallic coplanar beams, means for driving the beams into flexural vibration in a plane normal to their common plane, and means for detecting changes in the frequency of the flexural vibrations of the beams in response to changes in tension applied to the sensor.

BRIEF DESCRIPTION OF THE DRAWINGS

In order that the present invention may be more readily understood, embodiments thereof will now be described by way of example and with reference to the accompanying drawings, in which.

DETAILED DESCRIPTION OF THE PREFERRED EMBODIMENTS

Figure 1:
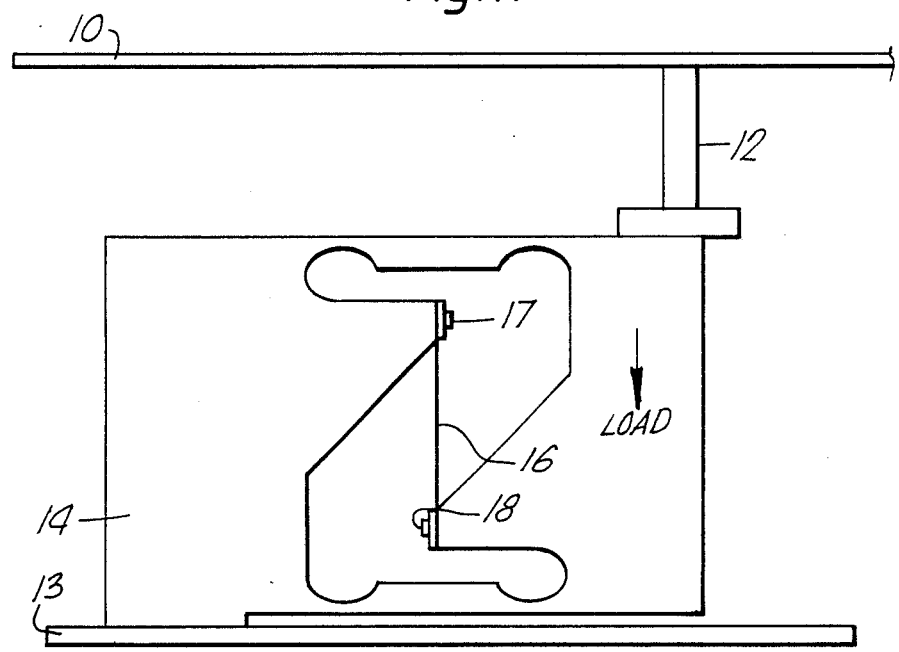
FIG. 1 is a side view of a weighing system incorporating a vibrational force sensor.

Referring now to FIG. 1 of the accompanying drawings this shows what is known as a Roberval mechanism. A weighing pan 10 is supported above a load cell 11 by a pan support 12. The cell 11 is made from a suitable metal and essentially comprises a hinged parallelogram. Thus the cell 11 is mounted on a base plate 13 at one side only, the mounting being indicated at 14.

As can be seen the bulk of cell 11 projects cantilever fashion over the base plate 13. The pan support 12 is mounted on the side of the cell remote from mounting 14. The central area of the cell 11 is cut away to leave a space 15 which in this embodiment resembles a crude representation of the letter Z. A three-beam sensor 16 is mounted in this space by respective top and bottom sensor fixings 17 and 18 and is held under tension even when the cell is unladen. When a load is placed on the weigh pan 10 the cell 11 flexes in response to the added weight and changes the tension in the force sensor. In operation of the weighing system the sensor 16 is driven into flexural vibrations and these are detected. The frequency of the vibrations varies with the applied load so that a measurement of the load can be derived from the detected frequency. This part of the weighing system will be described later.

Figure 2:
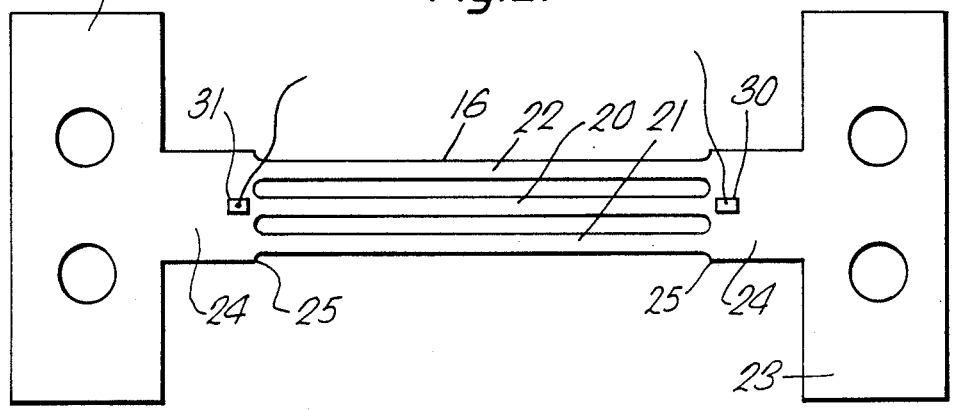
FIG. 2 is a plan view of a vibrational force sensor according to the present invention.

Referring now to FIG. 2 of the drawings this shows a plan view of sensor 16. The sensor is appropriately manufactured from a metal or metal alloy. Previously, as in patent specification No.2141231 B the sensor or beam has been manufactured from a piezoelectric material. However use of a metal provides a number of advantages. Firstly there is a large variety of alloys available which in turn allows a wide range of properties to be chosen. Secondly metal sensors can be manufactured using a large number of techniques, including machining, spark eroding, chemical etching and laser machining. Thirdly metal sensors are tough, robust and have good shock resistance.

The three beam sensor shown in FIG. 2 comprises a central beam 20 surrounded by outer beams 21, 22 with all the beams being of equal width. The beams 20-22 are manufactured from a single piece of metal which has flanges 23 at each of its ends by means of which the sensor can be mounted in a load cell. As can be seen in FIG. 2 the three beams 20-22 extend from common beam mounting portions 24 having shoulders 25. The width of each shoulder 25 is approximately half of the space between any two adjacent beams.

Another difference between the three beam sensor being described and that disclosed in patent specification 2141231 B is that the three beams are all of equal width so that their unstressed resonant frequencies are equal. This leads to a number of advantages as compared to the 1-2-1 geometry of width ratios of the three beam sensor disclosed in the prior patent specification. In the 1-2-1 geometry the ratios of beam width to thickness of the central and outer beams are necessarily unequal, causing small differences in frequency, especially for ratios close to 1. Furthermore with the 1-1-1 ratio of the present invention the shoulders of the 1-1-1 assembly can easily be designed to make all three beams see equal tensile stresses. It is difficult to design manufacturable shoulders for the 1-2-1 geometry which neither subject the beams to unequal stresses nor give the beams unequal lengths.

Finally when a minimum beam breadth and maximum sensor lengths are determined, for example by limitations of manufacturing technique and starting material size, a greater ratio of length to overall width can be achieved with the 1-1-1 geometry.

In the embodiment shown in FIG. 2 a piezoelectric drive transducer is shown at 30 and a piezoelectric detect transducer is shown at 31. As will become apparent this is not the only possible drive-detect mechanism for the force sensor.

Figure 3:
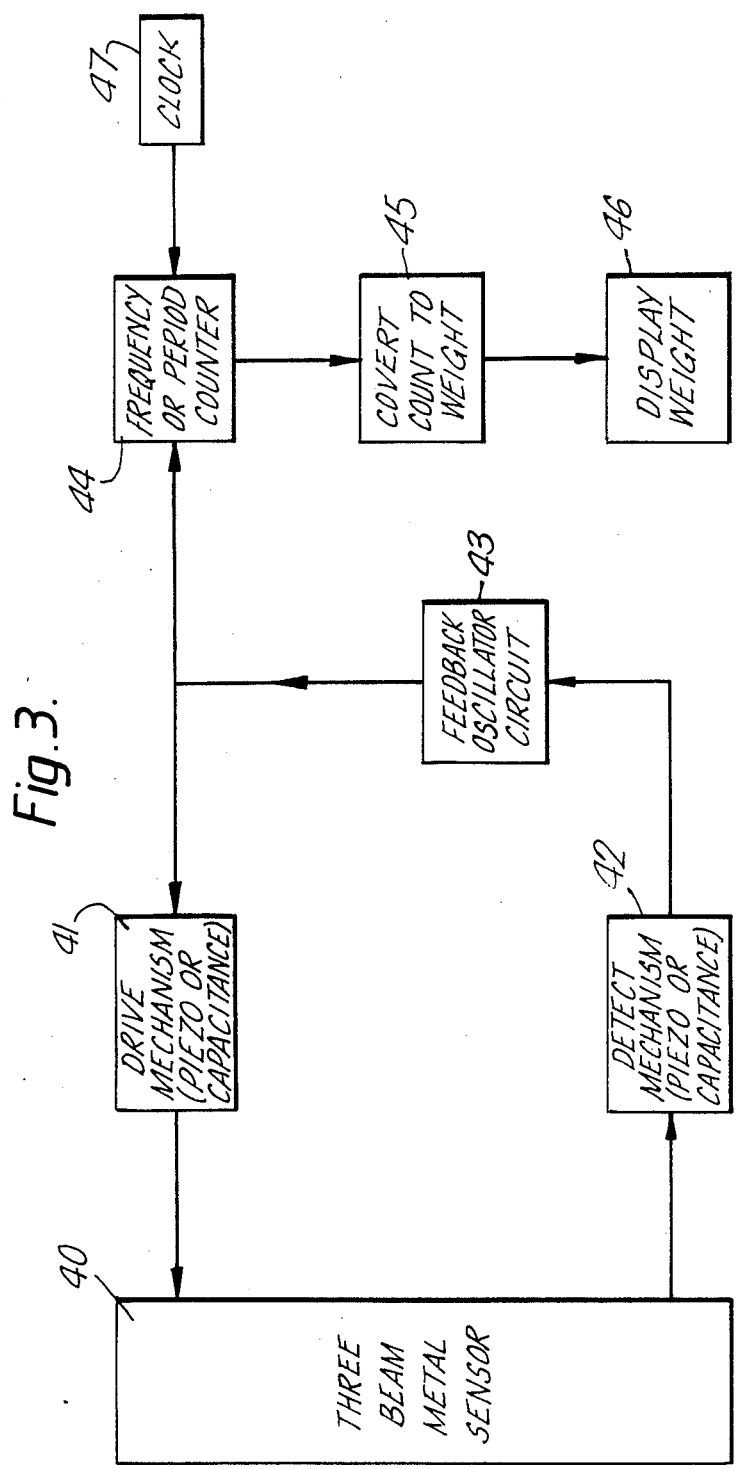
FIG. 3 is a block diagram of a weighing system incorporating the force sensor of FIG. 2, and FIGS. 4 and 5 are respectively plan and side views of an embodiment of a drive and detection arrangement.

Referring now to FIG. 3 of the accompanying drawings this shows a general block diagram of a weighing system including a sensor of the kind shown in FIG. 2.

The sensor itself is shown at 40 and the drive and detect elements at 41 and 42 respectively. The drive element 41 is driven by a feedback oscillator circuit 43 which in turn receives the detected vibrational frequency of the sensor beam from detect element 42. When the sensor is connected to oscillator circuit 43 the circuit oscillates at a frequency determined by the resonant frequency of the sensor. Thus the electrical signal that the oscillator circuit 43 feeds to drive circuit 41 is counted in a frequency or period counter 44 against a clock signal generated by a Clock circuit 47. The output of counter circuit 44 is a number related to the weight being measured as the resonant frequency of the sensor will vary with varying loads. A calculating circuit 45 translates the output of counter 44 into a weight-reading which is then available for display by display 46 and/or for further processing such as taring, signal averaging or temperature correction.

Whilst the beam of the sensor may be driven into vibration and the frequency of vibration detected by piezoelectric; optical, or electromagnetic drive the present invention uses a non-contact capacitive method.

In operation of the sensor the two outer electrodes of the three drive electrodes 50 are supplied with a sinusoidal voltage and the inner electrode is supplied with a voltage in antiphase. At the same time the sensor 60 and the shield 71 are maintained at constant potentials which need not be the same. The drive voltages applied to the drive electrodes provide electrostatic forces which alternatively cause repulsive and attractive forces between the beams of the sensor 60 and the corresponding electrodes 50 in accordance with the relative sign of the applied voltage.

These forces cause corresponding movement between the sensor and the detect electrodes 51. As the detect electrodes are kept at constant potentials by suitable feedback circuits the charge on each electrode will vary and this is used to derive the requirement measurement.

Figure 4:
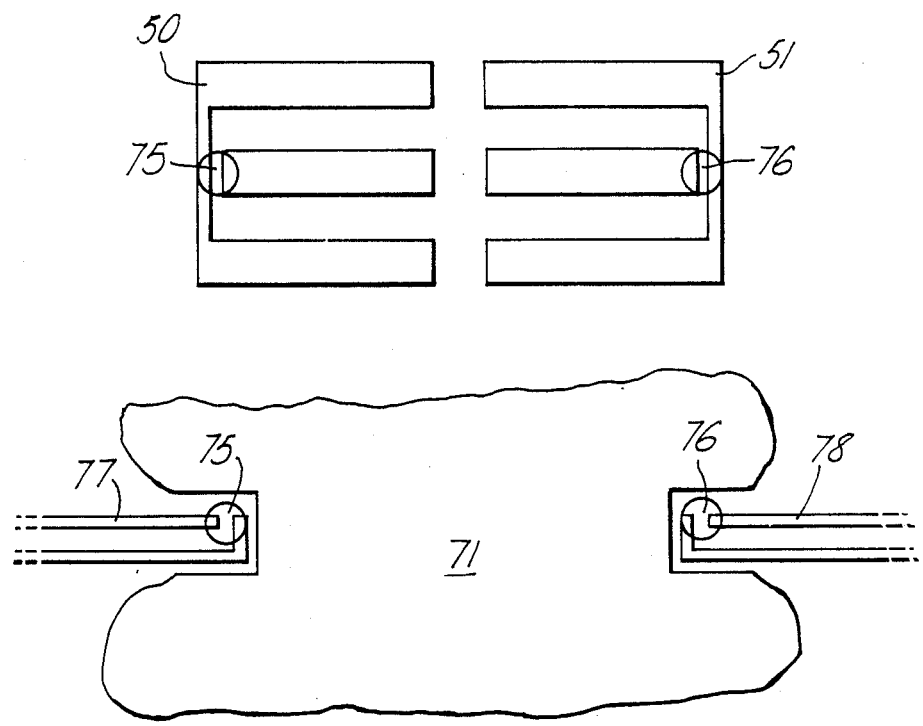
Figure 5:
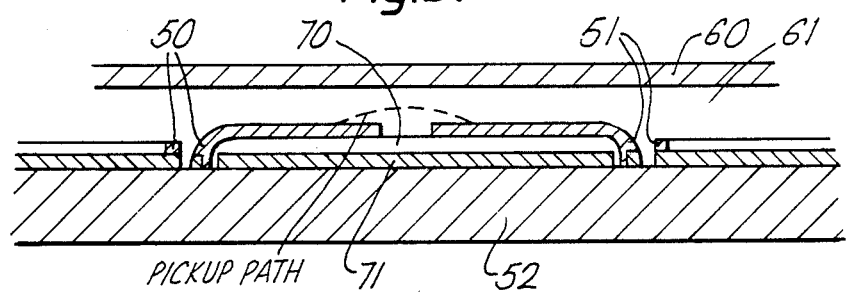

Referring now to FIGS. 4 and 5 these show a preferred form of capacitive drive and detection. In this arrangement the detector and drive electrodes 51 and 50 are made from a graphite-based conductive ink and have been deposited on a layer 70 of solder resist in turn deposited on the upper copper layer 71 of a PCB 52. This layer 52 is sufficiently close to the electrodes 50, 51 to act as a shield with the solder resist layer 70 acting as insulation.

In FIG. 4 the electrodes 50, 51 have been shown separate from the shielding layer and displaced from it. Thus in the figure the circles 75, 76 represent holes in the solder resist layer 70 through which the drive and detect electrodes can make contact with drive and detect connections 77, 78 etched on the surface of the PCB 52. The arrangement of electrodes, resist layers and PCB can best be appreciated from the section shown in FIG. 5. This arrangement removes most of the pick up through the PCB leaving pickup through the air (or vacuum or other medium) gap 61 as the dominant pickup mechanism. This enables separation of the electrodes to be small relative to the thickness of the substrate. This in turn means that smaller structures can be used. In a typical 3 beam embodiment the vibrating portion of the beam can be between 5 and 50 millimeters long. The individual bream can be between 0-5 to 2 millimeters wide.

The use of a capacitive drive and detection has a number of advantages over known piezoelectric or optical drives.

Thus the electronic components are cheap compared with the other technologies. Furthermore there is low power dissipation in the actual sensor itself. Finally the lack of physical contact between the sensor and the drive and detect components is advantageous in that piezoelectric transducers and their output connections can upset the elastic properties of the sensor.

FIGS. 4 and 5 of the drawings show the invention is used with a PCB. Alternatively the invention may be used with either thick or thin film substrates.

The manner in which the electrodes are located on the substrate will be dependent on the nature of the latter.

It will be realised that whilst the foregoing description has been directed to the use of three-beam sensors in a weighing system that this is not the only possible application of such sensors. Thus the sensors can be used in accelerometers, pressure sensors, hydrophones, thermometers, inclinometers and the like.

We claim:

1. A vibrational force sensor, comprising: a strip having three metallic coplanar beams spaced side by side; capacitive means for driving the beams into flexural vibration in a plane normal to the common plane of the beams; capacitive means for detecting changes in the frequency of the flexural vibrations of the beams in response to changes in tension applied to the sensor, said capacitive driving and detecting means including drive and detect electrodes, a shielding layer of conductive material having a surface, an intermediate insulating layer having a surface and being located on the surface of the shielding layer, said drive and detect electrodes being formed on the surface of the intermediate insulating layer; a feedback oscillator circuit having an input to which the detect electrode is connected, and an output to which the drive electrode is connected, said oscillator circuit being operative for generating an output signal for driving said drive electrode; and converter means connected to the output of said feedback oscillator circuit for converting said output signal into a weight signal.

2. A sensor as claimed in claim 1, wherein said drive and detect electrodes are constituted of a graphite-based conductive ink.

3. A sensor as claimed in claim 2, wherein said intermediate insulating layer is a layer of solder resist.

4. A sensor as claimed in claim 1, wherein said shielding layer is part of a printed circuit board.

5. A sensor as claimed in claim 1, wherein said shielding layer is a thin film substrate.

6. A vibrational force sensor, comprising: three metalic coplanar beams spaced side by side; capacitive means for driving the beams into flexural vibration in a plane normal to the common plane of the beams; capacitive means for detecting changes in the frequency of the flexural vibrations of the beams in response to changes in tension applied to the sensor, said capacitive driving and detecting means including drive and detect electrodes, a shielding layer of conductive material formed by a thick film substrate, an intermediate insulating layer having a surface and located on the shielding layer, said drive and detect electrodes being formed on the surface of the intermediate insulating layer; a feedback oscillator circuit connected to said drive and detect electrodes, and operative for supplying a sinusoidal voltage drive signal having a frequency to said drive electrodes; a counter means for counting the frequency of the drive signal supplied to the drive electrodes and generating an output count signal; clock means for supplying a clock signal to said counter means; and converter means for converting the output count signal of said counter means into a weight signal.

7. A sensor as claimed in claim 6, wherein said drive and detect electrodes are constituted of a graphite-based conductive ink.

8. A sensor as claimed in claim 7, wherein said intermediate insulating layer is a layer of solder resist.

9. A vibrational force sensor, comprising: a strip having three coplanar beams of equal width spaced side by side; capacitive means including three drive electrodes, one associated with each beam, for driving the beams into flexural vibration in a plane normal to the common plane of the beams; capacitive means including detect electrodes for detecting changes in the frequency of the flexural vibrations of the beam in response to changes in tension applied to the sensor; a feedback oscillator circuit, an output of which is connected to said drive electrodes so as to supply a sinusoidal output signal to two of said drive electrodes and the antiphase of said output signal to the other one of said drive electrodes, and an input of which is connected to said detect electrodes; and means for generating a weight reading from said output signal.

* * * * *